Figure 1:
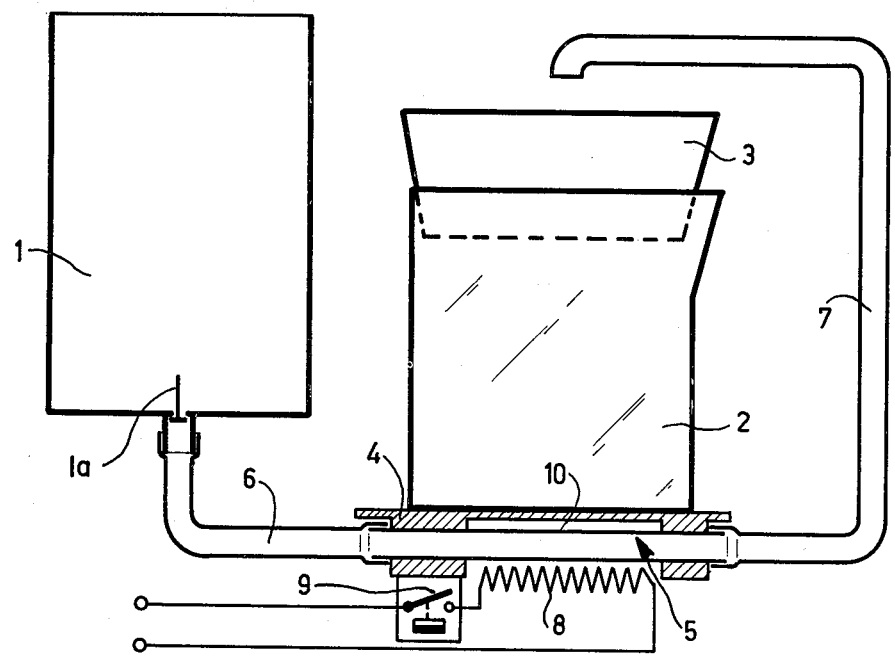

United States Patent

Gijzel et al.

[11] 4,224,503
[45] Sep. 23, 1980

[54] COFFEEMAKER WATER HEATER HAVING AN ARRANGEMENT FOR THERMALLY REMOVING SCALE DEPOSITS

[75] Inventors: Jacobus M. Gijzel, Groningen; Andries T. Reeder, Drachten, both of Netherlands

[73] Assignee: U.S. Philips Corporation, New York, N.Y.

[21] Appl. No.: 848,463

[22] Filed: Nov. 4, 1977

[30] Foreign Application Priority Data

Dec. 22, 1976 [NL] Netherlands .................... 7614235

[51] Int. Cl.$^2$ .................... H05B 1/02; F24H 7/00; F28G 13/00; A47J 31/56
[52] U.S. Cl. .................... 219/308; 99/281; 99/288; 122/379; 134/17; 134/19; 134/22 C; 165/95; 202/DIG. 1; 219/301; 219/328
[58] Field of Search .................... 219/280–281, 219/300–301, 308–309, 315, 283, 328, 331; 122/379; 165/95, 84; 202/DIG. 1; 203/7; 134/1, 19–20, 22 R, 22 C, 42, 17; 99/280–281, 279, 288, 304–306, 285; 159/DIG. 13

[56] References Cited

U.S. PATENT DOCUMENTS

| | | | |
|---|---|---|---|
| 1,191,451 | 7/1916 | Morterud | 134/17 |
| 2,452,367 | 10/1948 | Gangloff | 134/19 UX |
| 3,423,568 | 1/1969 | Meckley et al. | 219/279 |
| 3,691,934 | 9/1972 | Horn et al. | 219/301 |
| 3,870,468 | 3/1975 | Neti | 219/301 X |
| 4,032,748 | 6/1977 | Vischer et al. | 165/84 |
| 4,122,763 | 10/1978 | Waninger et al. | 99/281 |
| 4,139,761 | 2/1979 | Obrowski | 99/288 |
| 4,141,286 | 2/1979 | Smit | 99/285 |

FOREIGN PATENT DOCUMENTS

| | | | |
|---|---|---|---|
| 2621159 | 11/1977 | Fed. Rep. of Germany | 219/308 |
| 7500158 | 7/1976 | Netherlands | 219/306 |
| 1188696 | 4/1970 | United Kingdom | 99/307 |
| 1501831 | 2/1978 | United Kingdom | 219/306 |

*Primary Examiner*—A. Bartis
*Attorney, Agent, or Firm*—Thomas A. Briody; William J. Streeter; Rolf E. Schneider

[57] ABSTRACT

There is provided a coffeemaker comprising a water reservoir, a quartz-glass tubular heating chamber having an external electrical heating element in contact therewith, an inlet tube for conducting water from the reservoir through the chamber, and an outlet tube for discharging the heated water over ground coffee. Associated therewith is a switch responsive to the temperature of the heating chamber wall for automatically de-energizing the heating element. When the flow of water through the heating chamber ceases, the heat capacity of the heating chamber, the electrical power consumption of the heating element, and the location and the adjustment of the temperature-responsive switch are so related to each other that the heating chamber walls will be rapidly heated to a temperature of at least about 450° C. before the heating element is de-energized by the temperature-responsive switch. The result is that any scale on the heating chamber walls is thereby thermally decomposed and removed.

3 Claims, 3 Drawing Figures

COFFEEMAKER WATER HEATER HAVING AN ARRANGEMENT FOR THERMALLY REMOVING SCALE DEPOSITS

This invention relates to a heating apparatus for water having a heating chamber and a heating element which is separated from the heating chamber by a wall.

Such heaters are frequently employed inter alia in domestic appliances such as coffeemakers of the type described in U.S. Pat. No. 3,507,209.

A problem which is frequently associated with such an apparatus is that owing to the deposit of a hard water scale on the wall the transfer of heat to the water is unfavourably affected. This scale is produced from mineral salts in the water and with continued use of the apparatus the water chamber may become clogged and the heating element and other parts of the apparatus may be damaged.

The heating apparatus of the invention is designed to mitigate this problem. According to the invention, there is provided a heating apparatus for water having a heating chamber and a heating element which is separated from the heating chamber by a wall, in which the apparatus includes a device for temporarily raising the temperature of the wall to approximately the removal temperature of scale, and the wall is manufactured of a material which can withstand this temperature.

Removal of the scale requires a rise in the temperature of the wall to at least about 450° C. This high temperature of the wall causes the scale deposit on the wall to be decomposed into gaseous and pulverulent substances, and the activity provided by the decomposition action will also cause residual scale to become detached from the wall. In addition the scale will become detached from the wall as a result of a difference in thermal expansion between the scale and the material of the wall which will produce forces likely to assist separation of the scale.

As indicated above, a coffeemaker having a water reservoir connected to a heating chamber comprises such an electrical heating apparatus. In accordance with the invention, the heating element associated with the heating chamber is controlled with the aid of a temperature-sensitive switch which is responsive to the rise in temperature of the heating chamber when the supply of water from the reservoir to the heating chamber has ceased. Advantageously the heat capacity of the heating chamber, the electrical power consumption of the heating element and the location and the adjustment of the temperature-sensitive switch are so arranged that the temperature-sensitive switch does not cut out until the temperature of the wall of the heating chamber has substantially reached the decomposition temperature of scale.

In such an appliance the heating chamber may for example take the form of a tube of a material with a high melting point, preferably quartz glass, the heating element being disposed at the outside on the tube wall. The heating element may be formed by a coating which adheres to the wall of the heating chamber.

Figure 2:
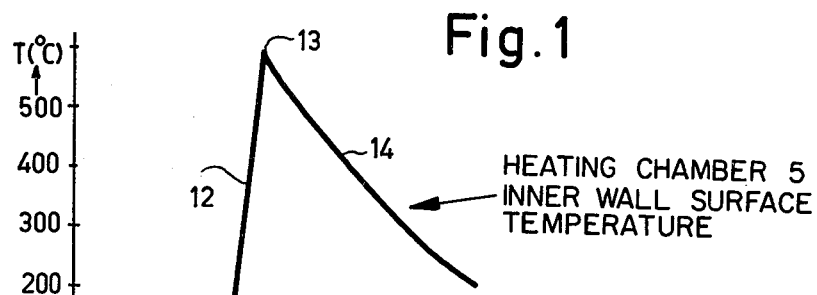
Figure 3:
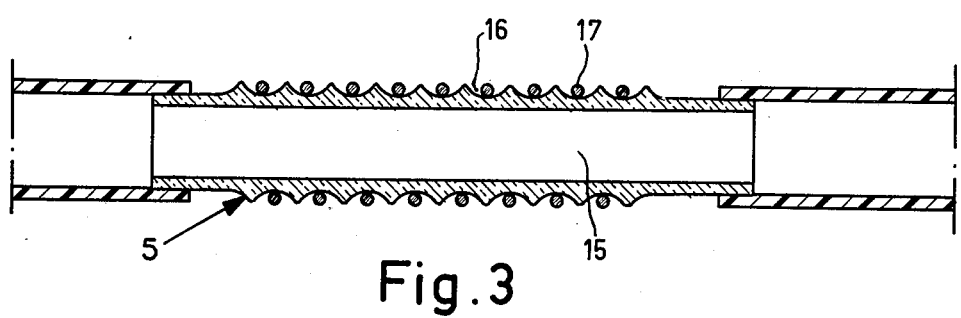

The invention will now be described in more detail with reference to the accompanying drawing in which:

FIG. 1 schematically shows a coffeemaker,

FIG. 2 is a graph of the temperature of the wall of the heating chamber as a function of time, and FIG. 3 shows on an enlarged scale a heating chamber of for example a ceramic material or glass.

The coffeemaker of FIG. 1 comprises a water reservoir 1 having a non-return valve 1a, a receptacle 2 and a filter holder 3 which can be placed onto the receptacle 2. The receptacle is positioned on a supporting plate 4 underneath which a heating chamber 5 is located. The water reservoir is connected to the heating chamber 5 by means of a pipe 6 whilst a discharge pipe 7 communicates with the heating chamber and terminates above the filter holder 3. The heating chamber is provided with a heating element 8 which is connected in series with a temperature-sensitive switch 9.

In operation, after the water reservoir has been filled with water and a voltage is applied to the heating element 8, the heat from the heating element is transferred to a first small portion of the water via a wall 10 of the heating chamber. Water from the reservoir is pumped by the heating chamber 5 to the filter holder 3 via the discharge pipe 7. The water flow percolates through a prepared quantity of ground coffee in the filter holder 3 and a resulting hot liquid coffee brew is collected in the receptacle 2. The temperature T of the wall 10 of the heating chamber 5 will then have a substantially constant value of about 100° C, as is indicated on the graph of FIG. 2 at 11.

When all the water has been conveyed from the reservoir 1 to the filter holder 3, the temperature of the wall 10 of the heating chamber 5 will rise, for example as is indicated at 12 on the graph of FIG. 2. The electrical power consumption of the heating element 8, the heat capacity of the heating chamber 5, and the location and the adjustment of the temperature-sensitive switch 9 can be related to each other in such a way that the switch 9 does not interrupt the electric circuit of the heating element 8 until some time t after the operations of heating and pumping of the water have taken place and the temperature of the wall 10 of the heating chamber 5 reaches a value which corresponds approximately to the decomposition temperature of scale. This value is indicated by point 13 on the graph of FIG. 2. After a temperature corresponding to point 13 has been reached, the switch 9 will operate to break the heater circuit and then the temperature will decrease substantially in accordance with the curve 14 on the graph of FIG. 2.

In practice it has been found that a temperature of 700° to 800° C. is very effective. Any deposit of scale, which mainly consists of calcium carbonate is then at least partly decomposed into carbon dioxide and calcuim oxide (CaO), which decomposition products tend not to adhere to the wall. As this decomposition process generally begins in a scale layer immediately in contact with the wall 10, layers of scale which are situated more remotely from the wall 10 will become detached. Moreover, the difference in thermal expansion will also result in the scale becoming mechanically detached from the wall 10 and this effect will be enhanced at a more elevated temperature and where the scale has already decomposed locally. The decomposition products and the detached scale are not immediately removed from the appliance but are carried to the filter with a further water supply on the next occasion that the appliance is put into use. The presence of detached scale in the filter does not affect the quality of the coffee made with the appliance, and the amounts of detached scale produced by each descaling operation are comparatively small.

In this way the problem of scale deposit can be significantly reduced. Lower temperatures than the temperature mentioned above can also yield good results, the minimum temperature limit being approximately 450° C. Clearly, it is of importance that the high temperatures occur at the location of the heaviest scale deposit, in this case on the inside surface of the wall 10.

Providing the heating chamber with a wall of a material with a high melting point such as a ceramic material or heat-resistant glass has special advantages, because the volume of the heating chamber can then be small in comparison with the volume of a heating chamber of for example aluminium, so that the heat content is small and the high temperature is reached quickly. Moreover, the heat conduction of a ceramic material or glass is generally poor, so that the heat transfer to adjoining parts of the appliance will be comparatively small. Futhermore, the material can be provided with a particularly smooth surface, so that the adhesion of scale to the surface of the wall is likely to be minimized.

A special embodiment in which the heating chamber takes the form of a quartz-glass tube 15 is shown in FIG. 3. In the outer wall, grooves 16 are formed and these grooves support the turns of a spirally wound heating element 17. Instead of a spiral wire as the heating element it is also possible to use an electrically-conductive coating of for example a metal or metal-oxide composition on the outer wall of the tube.

Although the example relates to an appliance with an electric heating element, the invention may also be used in equipment with other kinds of heating elements, such as gas burners.

The invention, although described in an embodiment for a coffeemaker, can in general be used very simply in other heating appliances for water, in which the heating chamber is intended to be drained of water after usage and in which a resulting temperature rise is used for interrupting operation of a heating element via a temperature-sensitive switch. Examples of such other appliances include geysers, steam irons etc.

However the appliance may also be provided with a separate device, such as an interval timer with which the temperature rise to approximately the decomposition temperature of scale is effected, for example at periodic intervals. The heating element used for scale removal may alternatively be a different one from that providing the water heating effect in the apparatus.

What is claimed is:

1. A coffeemaker which includes a water reservoir; a tubular heating chamber formed of a quartz glass; an electrically operated heating element arranged externally of and in contact with said heating chamber; an inlet tube for conducting water from said water reservoir to and through said heating chamber to be heated therein; an outlet tube for discharging the heated water from the heating chamber over ground coffee; and a switch responsive to the temperature of the wall of said heating chamber for automatically de-energizing said heating element; the heat capacity of the heating chamber, the electrical power consumption of the heating element, and the location and the adjustment of said temperature-responsive switch being so related to each other that, in the absence of the flow of water from the water reservoir through the heating chamber, the walls of the heating chamber will be rapidly heated to a temperature of at least 450° C. before the temperature-responsive switch de-energizes the heating element, whereby any scale on the walls of the heating chamber will be decomposed.

2. A coffeemaker according to claim 1, in which the heating element is in direct contact with the external surface of the tubular heating chamber.

3. A coffeemaker according to claim 2, in which a spiral groove is formed in the external surface of the tubular heating chamber, and the heating element comprises an electrical wire wound in said groove.

* * * * *